(12) United States Patent
Lenz et al.

(10) Patent No.: US 6,504,645 B1
(45) Date of Patent: Jan. 7, 2003

(54) CHALCOGENIDE GLASS BASED RAMAN OPTICAL AMPLIFIER

(75) Inventors: Gadi Lenz, Fanwood, NJ (US); Richart Elliott Slusher, Lebanon, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/689,213

(22) Filed: Oct. 12, 2000

Related U.S. Application Data
(60) Provisional application No. 60/228,665, filed on Aug. 29, 2000.

(51) Int. Cl.[7] .............................. H01S 3/00; G02B 6/00
(52) U.S. Cl. ....................... 359/334; 359/342; 359/343; 385/141
(58) Field of Search ................................ 359/334, 342, 359/343; 385/141

(56) References Cited

U.S. PATENT DOCUMENTS

| | | | | |
|---|---|---|---|---|
| 5,148,510 | A | * | 9/1992 | Borrelli ...................... 385/142 |
| 5,568,497 | A | | 10/1996 | Bishop et al. ................. 372/40 |
| RE36,513 | E | * | 1/2000 | Aitken ......................... 385/144 |
| 6,198,870 | B1 | * | 3/2001 | Kubota ........................ 385/142 |
| 6,201,916 | B1 | * | 3/2001 | Eggleton et al. ............. 359/130 |
| 6,239,903 | B1 | * | 5/2001 | Islam et al. .................. 359/160 |
| 6,278,719 | B1 | * | 8/2001 | Ohishi ............................ 372/6 |
| 6,413,891 | B1 | * | 7/2002 | Cho et al. .................... 359/343 |

OTHER PUBLICATIONS

Aoki, Y. "Properties of Fiber Raman Amplifiers and Their Applicability to Digital Optical Communication Systems." J. Lightwave Tech. vol. 6. No. 7, Jul. 1988. pp. 1225–1239.*
Saito, M. et al. "Optical and Mechanical Properties of Infared Fibers." J. Lightwave Tech. vol. 6., No. 2, Feb. 1988. pp 233–239.*
Koch, F. et al. "Characterization of single stage, dual–pumped Raman fibre amplifiers for different gain fiber lengths." Elect. Lett. Feb. 17, 2000. pp 347–348.*
Ishikawa, E. et al. "hybrid Pr3+–doped fiber amplifier comprising of flouride and chalcgenide glasses." OFC Tech Digest, 1998. pp 140–141.*
Marchese, D. et al. "Pr+–doped 1.3 um optical fibre amplifiers in new GeS2–Based chalcogenide glasses." MELECON '98. pp. 1390–1394.*
Turnbull, D.A. "Rare–earth–doped chalcogenide glasses as infared sources." CLEO '97. pp. 254–255.*

(List continued on next page.)

Primary Examiner—Thomas H. Tarcza
Assistant Examiner—Andrew R. Sommer
(74) Attorney, Agent, or Firm—John F. McCabe (57) ABSTRACT

An optical amplifier includes a chalcogenide glass optical waveguide having optical input and output ports, coupled to the chalcogenide glass optical waveguide, a pump optical waveguide, and a wavelength-tunable pump laser. The pump optical waveguide couples the wavelength-tunable pump laser to the chalcogenide glass optical waveguide.

20 Claims, 5 Drawing Sheets

OTHER PUBLICATIONS

Kirchhof, J. "A–S based materials and fibres towards efficient 1.3 um fibre amplification." Elect. Lett. vol. 32, No. 13, Jun. 20, 1996. pp 1220–1221.*

Samson, B.N. "Dysprosium doped Ga:La:S glass for anb efficient optical fibre amplifier operating at 1.3 um." Elect. Lett. vol. 30, No. 19, Sep. 15, 1994.*

Dussardier, B. et al. Pr3+–doped Cs:Ga:S:Cl glass for efficient 13. um optical fibre amplifier. Elect. Lett. vol. 31, No. 3, Feb. 2, 1995. pp. 206–208.*

Asobe, M. et al. "Ultrafast and efficient optical Kerr Effects in chalcogenide glass fibers and the application in all optical switching." NLO '94 IEEE, 1994. pp 306–308.*

Hewak, D.W. "Progress Towards a 1300 nm fibre amplifier." New Developments in optical amplifiers, IEE colliquim on, Nov. 1998/ pp. 12/1–12/5.*

Chumash, V. and Cojocaru, I. "Nonlinear optical processes in noncrystalline semiconductors." Semiconductor Conference, 1996. Oct. 1996. pp. 507–516.*

Ewbank, M.D. et al. "A new chalcogenide crystal for nonlinear optics in the infared." CLEO '97. pp461–462.*

Richardson, K.A. et al. "Fabrication and properties of chalcogenide glasses for waveguides." CLEO (Europe) 2000. pp 33.*

Dianov, E.M. et al. "High Efficient 1.3 um Raman fiber amplifier." OFC '98, Tech. Digest. pp. 33–34.*

Richardson, K.A. et al. "Development of chalcogenide glasses for use in near–infared planar waveguide applications." Quantum Electronics and Laser Science Conference Tech. Digest. May 1999. pp 266–267.*

Spalter, S. et al. "Highly nonlinear chalcogenide glasses for ultrafast all optical switching in optical TDM communication systems." OFCC '2000. Mar. 2000. pp 137–139.*

Hewak, D.W. et al. "Applications of chalcogenide glasses for optical fibre amplifiers at 1.3 microns." Optoelectronic Systems 'LINK' Programme, IEE Conference on, 1994. pp. 3/1–3/6.*

Viens, J–F. et al. "FAbrication and Characterization of Integrated Optical Waveguides in Sulfide Chalcogenide Glasses." J. Lightwave Tech. vol. 17, No. 7, Jul. 1999.*

Page, R.H. et al. "Cr2+–Doped zinc Chalcogenides as Efficient, Widely Tunable Mid–Infared Lasers." IEEE J. Quantum Elect. vol. 33, No. 4, Apr. 1997.*

EP 1 184 943 A1 search report. Aug. 14, 2001.*

Ho, M.–C. et al. "Fiber optical parametric amplifier and wavelength converter with 208—nm gain bandwidth." CLEO 2000, May 11, 2000; pp. 401, 402.*

European Patent Office Search Report, Application No. 01302211.6–2214, The Hague, Aug. 27, 2001.

Masuda H et al., "1.65 mu m band fibre Raman amplifier pumped by wavelength–tunable amplified spontaneous emission light source" Electronics Letters, Nov. 26, 1998, IEE, UK, vol. 34, No. 24, pp. 2339–2340.

Asobe M et al: "Third–order nonlinear spectroscopy in As/sub 2/S/sub 3/ chalcogenide glass fibers" Journal of Applied Physics, Jun. 1, 1995, USA. vol. 77, No. 11, pp. 5518–5523.

* cited by examiner

CHALCOGENIDE GLASS BASED RAMAN OPTICAL AMPLIFIER

This application claims the benefit of the U.S. Provisional Application No. 60/228,665, filed Aug. 29, 2000.

BACKGROUND OF THE INVENTION

1. Field of the Invention

This invention relates to Raman optical amplifiers.

2. Discussion of the Related Art

To compensate attenuation, optical communication systems often provide for amplification of optical signals at regular intervals along optical transmission fibers. The amplification may be produced by amplifiers based on rare-earth elements such as erbium and ytterbium or by amplifiers based on the Raman effect. Rare-earth amplifiers have limited bandwidth due to their reliance on selected atomic level transitions. Amplification occurs at discrete wavelengths that correspond to the selected atomic transitions. Broadband erbium doped fiber amplifiers are somewhat improved rare earth amplifiers so that these rare-earth amplifiers can power some wavelength division multiplexed (WDM) optical networks. On the other hand, Raman amplifiers are naturally tunable and capable of providing amplification at wavelengths in a broad optical band. In such an amplifier, an amplification wavelength is simply selected by tuning a pump laser to produce a wavelength capable of producing stimulated Raman emission at the selected wavelength. Raman amplifiers can cover a much wider spectral range than rare-earth based amplifiers. Furthermore, Raman amplifiers have effectively lower noise levels than rare-earth amplifiers. These advantages make Raman amplifiers desirable for long haul WDM systems where the transmission bandwidth may be broad.

Nevertheless, conventional Raman fiber amplifiers provide relatively low gain. In such amplifiers, an optical signal often has to propagate through a long and heavily pumped amplifier fiber to receive adequate amplification. For example, to produce a 20-dB amplification, some conventional Raman fiber amplifiers use 10 to 100 kilometers (km) of amplifier fiber and 300 to 1,000 milli-Watts (mW) of pump light. High pump light powers require expensive pump lasers and incur higher operating costs for pump lasers. Raman amplifiers based on shorter amplifier fibers and lower pumping powers are desirable.

BRIEF SUMMARY OF THE INVENTION

In one aspect, the invention features an optical amplifier including a chalcogenide glass optical waveguide with optical input and output ports, a pump optical waveguide, and a wavelength-tunable pump laser. The pump optical waveguide couples the wavelength-tunable pump laser to the chalcogenide glass optical waveguide.

In a second aspect, the invention features a method of amplifying light. The method includes tuning a wavelength-tunable pump laser to produce pump light with a wavelength capable of causing Raman amplification in a chalcogenide glass optical waveguide in response to light of a selected wavelength being received in the chalcogenide glass optical waveguide. The method also includes delivering the pump light to the chalcogenide glass optical waveguide, and receiving input light with the selected wavelength in the chalcogenide glass optical waveguide.

In a third aspect, the invention features an optical communication system. The system includes a plurality of silica glass optical fibers and at least one Raman amplifier coupled between two of the silica glass optical fibers. The Raman amplifier of the present invention includes a chalcogenide glass optical waveguide connecting the two of the silica optical fibers, a pump optical waveguide, and a wavelength-tunable pump laser. The pump optical waveguide couples the pump laser to the chalcogenide glass optical waveguide.

DETAILED DESCRIPTION OF THE INVENTION

Various embodiments provide improved Raman amplification by using optical amplification media made of chalcogenide glass instead of optical amplification media made of silica or other oxide glasses.

Figure 1:
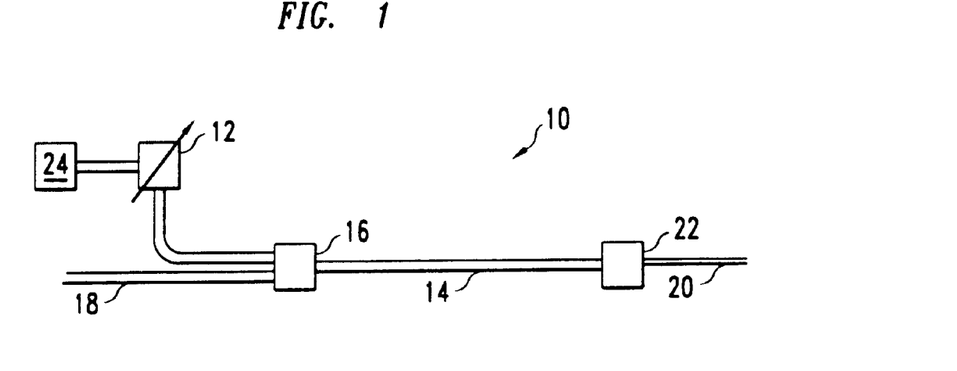
FIG. 1 shows one embodiment of a Raman amplifier.

FIG. 1 shows one embodiment of a Raman amplifier 10 in which a wavelength-tunable pump laser 12 couples to an input port of a chalcogenide glass amplifier waveguide 14 via a 2×1 optical connector 16. The wavelength-tunability of the pump laser 12 enables amplification of light belonging to a wide band of wavelengths unlike conventional rare-earth based amplifiers in which the amplification wavelength is not tunable and pumping sources are thus, not wavelength tunable. In various embodiments, the amplifier medium 14 is either an optical fiber or a planar waveguide.

The optical connector 16 also connects an input waveguide 18, e.g., a silica optical transmission fiber, to the input port of the chalcogenide glass amplifier waveguide 14. An output port of the chalcogenide glass amplifier waveguide 14 couples to an output waveguide 20, e.g., another silica optical transmission fiber, via an optical coupler 22. In some embodiments, the coupler 22 selectively filters out light at wavelengths produced by the pump laser 12 so that pump light is not transmitted to the output waveguide 20.

By using an amplification medium of chalcogenide glass, Raman amplifier 10 improves the gain over gains available from silica-glass Raman amplifiers. The origin of the improvement can be understood from an approximate equation for a waveguide's Raman gain, G. The equation states that $G = K'e^{gIL}$. Here, "g" is the Raman gain coefficient, L is the length of the amplifier waveguide, and I is the pump light intensity. The Raman gain cross section is proportional to the Kerr coefficient, $n_2$. Thus, the Raman gain (G) depends exponentially on the product of the Kerr coefficient, $n_2$, and the pump light intensity, I.

The exponential dependence on $n_2$ implies that many chalcogenide glasses will produce much larger Raman gains than silica-glasses, because the $n_2$'s of those chalcogenide glasses are much larger than the $n_2$'s of silica glasses. For example, some chalcogenide glasses based on Se compounds have $n_2$'s that are about 50 to 1,000 times as large as the $n_2$'s of silica glasses, i.e., at least 50 or 200 times the $n_2$ of undoped silica glass. The Raman amplifier 10 uses one of the high $n_2$ chalcogenide glasses for the optical core of amplifier waveguide 14.

The equation for gain (G) also provides guidance for determining the length of the chalcogenide glass fiber, because the total amplification depends on the product $LIn_2$. For example, to produce the same amplification as a silica-based Raman amplifier for which LI is about (10 kilometers) (500 mW), the Raman amplifier 10 only needs to have a length times power value of about 25,000 to 5,000 meter-mW. Various amplifiers use less than 500 meters of chalcogenide fiber and a pump source that produces less than 500-mW of pump light due to the increased $n_2$ of chalcogenide glasses. For example, a 100-meter length of chalcogenide fiber and a 50–250 mW pump source is able to produce as much amplification as 10-kilometer (km) of silica-based Raman amplifier fiber and a 500-mW pump source.

Herein, chalcogenide glass is defined to be an amorphous material that transmits visible and near infrared light and includes a compound of selenium (Se), tellurium (Te), and/or sulfur (S) with one or more other elements. The combined molar percentage of Se, Te, and/or S is typically at least 25 percent. In the compounds, examples of the other elements include germanium (Ge), arsenic (As), tin (Sb), thallium (Tl), lead (Pb), phosphorous (P), gallium (Ga), indium (In), lanthium (La), silicon (Si), chlorine (Cl), bromine (Br), iodine (I), and a rare earth element. The chalcogenide glasses are not oxide glass unlike standard silica optical glasses.

Figure 2:
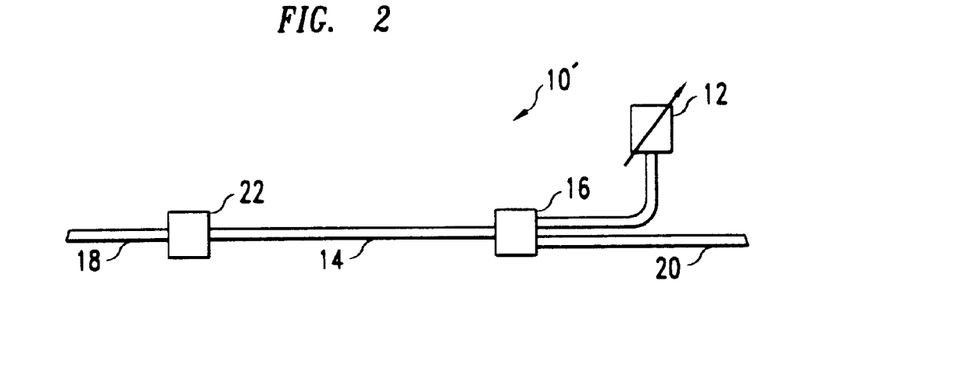
FIG. 2 shows an alternate embodiment of a Raman amplifier.

FIG. 2 shows an alternate embodiment of a Raman amplifier 10' in which wavelength-tunable pump laser 12 couples to one end of chalcogenide glass amplifier waveguide 14 and input waveguide 18 couples to the other end of the chalcogenide glass amplifier waveguide 14. In the amplifier 10', pump light and input light counter- propagate in the amplifier waveguide 14 so that pump light does not appear in output waveguide 20.

Figure 3:
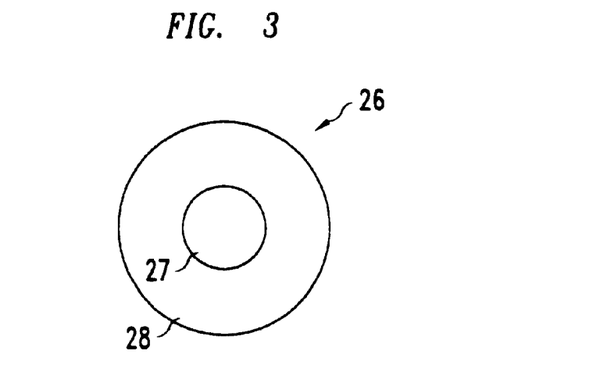
FIG. 3 is a cross-sectional view of a chalcogenide glass fiber used in some embodiments of the Raman amplifiers of FIGS. 1 and 2.

In some embodiments of amplifier 10 or 10' shown in FIGS. 1 and 2, waveguide 14 is a chalcogenide glass optical fiber. FIG. 3 is a cross-sectional view of a chalcogenide glass amplifier fiber 26 used in such embodiments. The fiber 26 includes a chalcogenide glass core 27 and a chalcogenide glass cladding 28. The core 27 has a diameter of about 2–14 microns ($\mu$m) and a preferable diameter of less than about 5 $\mu$m. The cladding 28 has an outer diameter of about 120–130 $\mu$m.

Core 27 and cladding 28 are made of chalcogenide glasses with different chemical compositions so that a jump in index of refraction occurs at the core-cladding interface. To provide for total internal reflection of light propagating in amplifier fiber 26, the core 27 has an index of refraction, $n_{core}$, that is higher than the index of refraction, $n_{cladding}$, of the cladding 28. To insure single-mode operation in the amplifier fiber 26, the fiber 26 is single modal, has fractional jump in index of refraction at the core-cladding interface, i.e., $\Delta = [n_{core} - n_{cladding}]/n_{cladding}$, of between 1 and 5 percent, and has a $V_{number}$ of less than about 2.4. Here, $V_{number} = (\pi D/\lambda)(n_{core}^2 - n_{cladding}^2)^{1/2}$, D is the core diameter, and $\lambda$ is the wavelength of the light propagating in the amplifier fiber 26. In WDM systems, $\lambda$ is between about 1.3 and 1.6 microns.

As an example, the core 27 may be made of $As_{40}Se_{60}$ glass, which has an index of about 2.7, and the cladding 28 may be made of $As_{40}S60$, which has an index of about 2.4. Then, $\Delta = 1.25$, and the core 27 has a diameter of less than about 3 microns to insure single-mode propagation of the light whose wavelength is about 1.5 microns.

In some embodiments, core 27 is made of $As_{40-40y}Se_{60-60y}S_{100y}$, $Ge_{28}Se_{60}Sb_{12}$, $Ge_{25}Se_{65-67}$, $Te_{8-10}$, or $As_{50}Se_{35}Cu_{15}$, and cladding 28 is made of $As_{40-40x}Se_{60-60x}S_{100x}$.

The choice of chalcogenide glass for the core 27 depends on the desired Raman gain, G. The gain depends on the Kerr coefficient of the core's glass. $As_{40}Se_{60}$ glass has a large Kerr coefficient, which improves the amplifier's gain. For long amplifier fibers, the gain also depends 2-photon absorption that generate pump light losses. Low 2-photon absorption rates occur, increasing the overall gain, if the chosen core glass has a bandgap that is larger than twice the energy of the desired pump light photons. U.S. patent application Ser. No. 09/399,625, filed Sep. 20, 1999, by H. Y. Hwang et al describes methods for choosing the glass composition for the core 27 and is incorporated by reference herein, in its entirety.

The choice of molar percentage of sulfur (S), i.e., 100×, in the cladding 28 depends on the above-discussed constraints on $V_{number}$ and $\Delta$, which insure single-mode operation. The index of refraction of $As_{40-40x}Se_{60-60x}S_{100x}$ varies approximately linearly from 2.7 to 2.4 as 100×varies from 0 to 100 percent so that the molar percentage "100×" in the cladding 28 can be chosen to satisfy the constraints for single modal operation.

Figure 4:
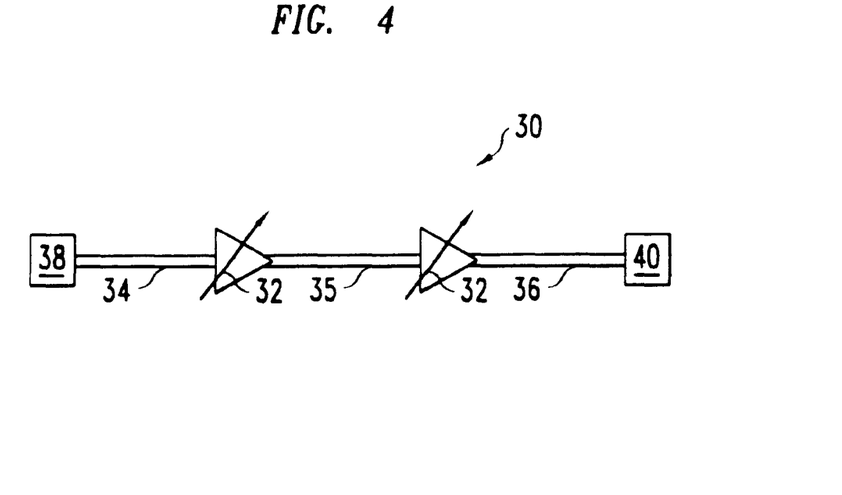
FIG. 4 shows a portion of an optical communications network that uses the Raman amplifiers of FIGS. 1 or 2.

FIG. 4 shows an optical communications network 30 that uses variable wavelength, chalcogenide glass, Raman amplifiers 32; e.g., amplifiers 10, 10' of FIGS. 1 and 2. The amplifiers 32 are regularly spaced between sequential segments 34–36 of an optical transmission fiber, e.g., segments made of multi-modal silica-glass fibers. The segments 34–36 form a transmission pathway optically connecting optical transmitter 38 to optical receiver 40. The lengths of the segments 34–36 of transmission fiber are short enough to insure that accumulated attenuations are less than about 20 decibels (dB) before the next stage of amplification. For example, modem silica-based transmission fibers produce an attenuation of about 0.2 dB per kilometer (km) for wavelengths between about 1.3 and 1.6 $\mu$. For such fibers, individual segments 34–36 are not longer than about 80 km.

Figure 5:
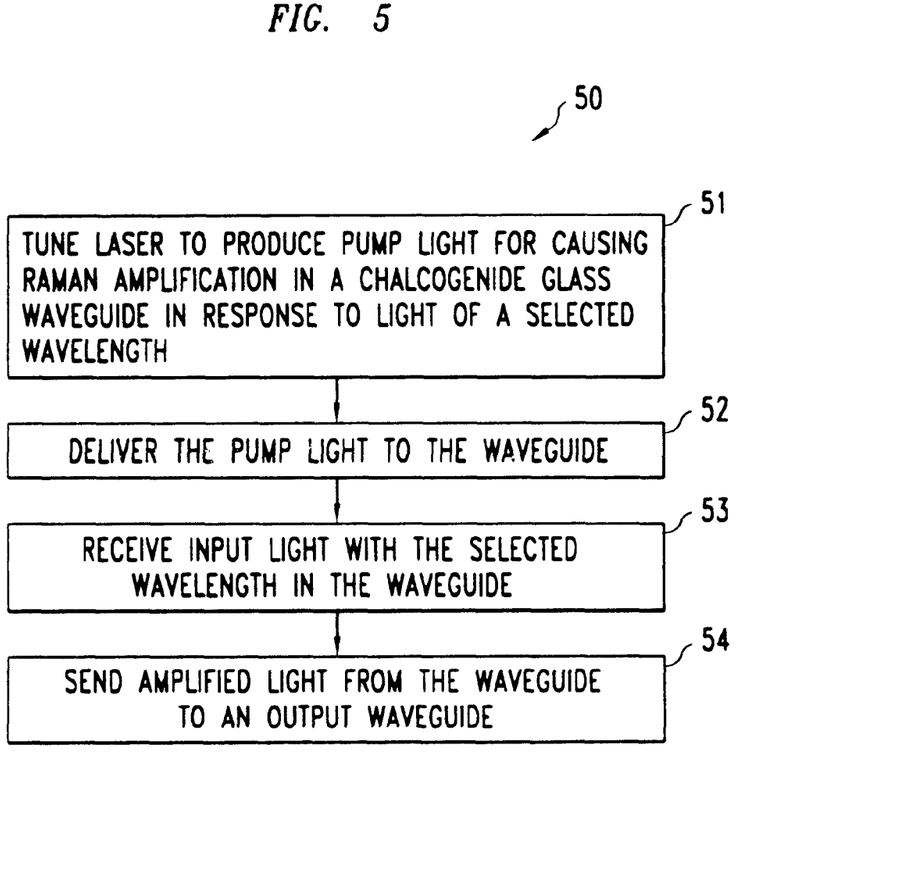
FIG. 5 is a flow chart showing a process for amplifying light with the Raman amplifiers of FIG. 1 or 2.

FIG. 5 is a flow chart for a process 50 that amplifies light with a Raman amplifier 10, 10' of FIG. 1 or 2. Prior to receiving input light, the process 50 tunes wavelength-tunable pump laser 12 to produce pump light whose wavelength is capable of causing Raman amplification in chalcogenide glass waveguide 14 in response to input light of a selected wavelength (step 51). The tuning may be performed by an operator or a programmable computer 24 that operates the wavelength-tunable pump laser 12. If the computer 24 controls the pump laser 14, the computer 24 looks up an appropriate pump light wavelength in a database look up table in response to an external request to amplify input light with the selected wavelength.

The choice of pump light wavelength depends on phonon spectrum of the chalcogenide glass and the selected wavelength to be amplified. In a Raman amplifier output light is produced by Raman events stimulated by the input light signal. The stimulated events occur due to the background intensity of pump light. In a stimulated Raman event, a pump photon produces both a stimulated photon and a stimulated phonon. Thus, the original energy and momentum of the pump photon is divided between the stimulated photon and phonon. This dividing of the original energy and momentum implies that the stimulated light has a longer wavelength than the pump light that produced the stimulated light. Since the stimulated light has the same wavelength as the input light, the pump photon must have an energy equal to the sum of the energy of the input photon plus the energy of the stimulated phonon. Thus, the pump light wavelength has a shift with respect to the input light wavelength, which is caused by phonon production.

Similar to other phonon-related properties, the size of the wavelength shift between the pump and input light depends on physical characteristics of the amplifier glass. The pump light wavelength is chosen to equal the input light wavelength minus the phonon-related wavelength shift associated with the particular chalcogenide glass used in amplifier waveguide 14. Phonon-related wavelength shifts are known and easily measurable by methods known to those of skill in the art.

The choice of pump light wavelength has some freedom due to the breadth of the Raman scattering cross section. The scattering cross section gives the probability of a Raman event as a function of the shift between wavenumbers of pump and input light.

Figure 6:
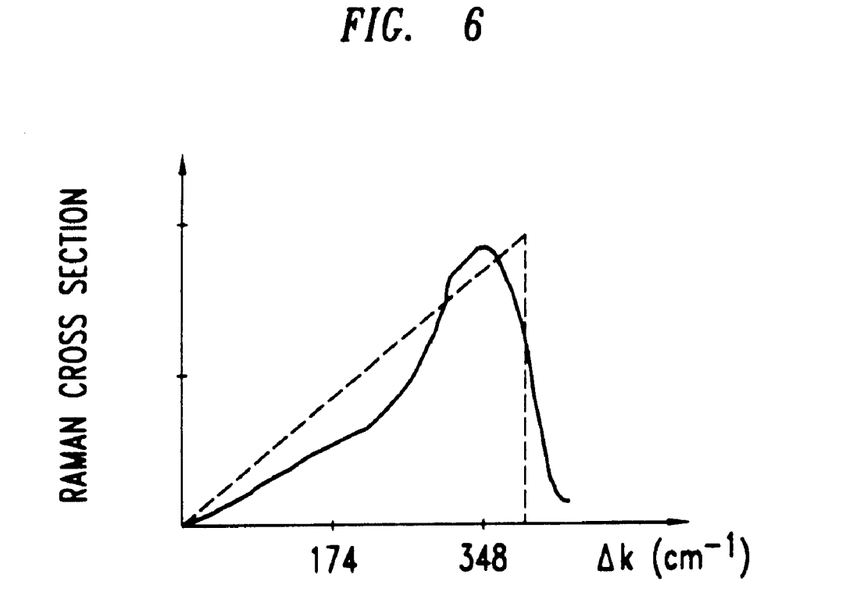
FIGS. 6 and 7 graphically illustrate the relationship between the wavelengths of pump light and input light in the process of FIG. 5.

FIG. 6 illustrates the Raman scattering cross section of $As_{40}S_{60}$ glass as a function of wavenumber shift, $\Delta k$. The wavenumber shift satisfies: $\Delta k = k_{pump} - k_{input}$ where $k_{pump}$ and $k_{input}$ are wavenumbers of the pump and input light, respectively. The Raman scattering cross section has an approximately linear dependence on $\Delta k$ and has a peak at $\Delta k = 348$ cm$^{-1}$. Choosing the wavenumber of the pump light, $k_{pump}$, to equal the wavenumber of the input light, $k_{input}$, plus 348 cm$^{-1}$ provides a high probability of Raman scattering and strong Raman amplification in $As_{40}S_{60}$ glass waveguides.

Figure 7:
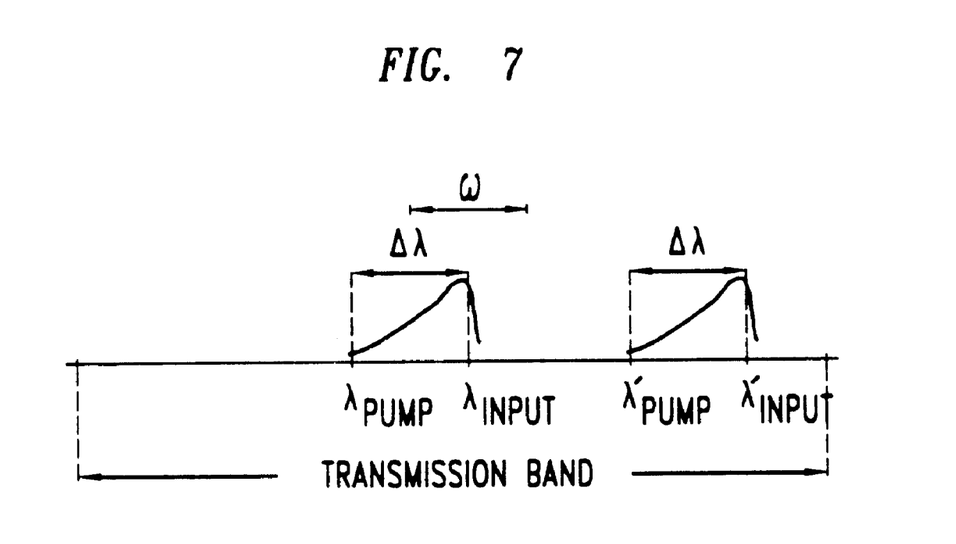

But, other pump light wavelengths for which Raman scattering cross sections are large, e.g., at least half the maximum cross section, are also possible choices for the pump light wavelength. Thus, the Raman cross section defines a window "w" of available choices for the pump light wavelength, $\lambda_{PUMP}$. FIG. 7 illustrates the window "w" of pump light wavelengths, $\lambda_{PUMP}$, for a selected input light wavelength, $\lambda_{INPUT}$. The phonon-induced wavelength shift is also shown for the chalcogenide glass used in the particular amplifier waveguide. In the example, the window "w" is smaller than the optical transmission band for input light, e.g., the transmission band may be a complete set of channels of a DWDM network. The wavelength-tunable pump laser 12 may be retuned to produce a new pump wavelength, $\lambda'_{PUMP}$, for amplifying a later-received input signal with a new wavelength, $\lambda'_{INPUT}$, that is outside of the original window "w".

Compositions of amplifier media, i.e., waveguide 14 of FIGS. 1 and 2, can be selected to produce amplification in a broader band of wavelengths for a particular choice of pump light wavelength. One way to broaden the amplification band entails making the amplifier waveguide of a mixture of two or more binary chalcogenide compounds with different phonon-induced Raman shifts. For example, the amplifier waveguide may be a mixture of $As_{40}S_{60}$ glass and $As_{40}Se_{60}$ glass, which have respective Raman wavelength shifts of 85 and 55 nanometers (nm). For such a ternary mixture, the total Raman scattering cross section is a sum of the individual scattering cross sections for the binary glasses in the mixture. This can result in a total scattering cross section that no longer has a linear dependence on shifts as shown in FIG. 6. Rather the mixture may have multiple peaks so that input signals with wavelengths for which the Raman cross section has a value at least half as large as one of the peak values would be amplified by the same pump light wavelength.

Referring again to FIG. 5, process 50 delivers pump light from wavelength-tunable pump laser 12 to chalcogenide glass amplifier waveguide 14 after choosing the pump light wavelength (step 52). The chalcogenide glass amplifier waveguide 14 receives input light, e.g., a sequence of digital optical pulses, with the selected input light wavelength from input waveguide 18 (step 53). The input light and simultaneously delivered pump light produce stimulated Raman emission in the amplifier waveguide 14 causing amplification of the input light therein. The process 50 sends light from the chalcogenide glass amplifier waveguide 14 to an output, e.g., output waveguide 20 or simply from an end of the amplifier waveguide 14 (step 54). The process 50 may also pass the light from the amplifier waveguide 14 through a filter that selectively removes pump light prior to sending the light to the output waveguide 20.

Figure 8:
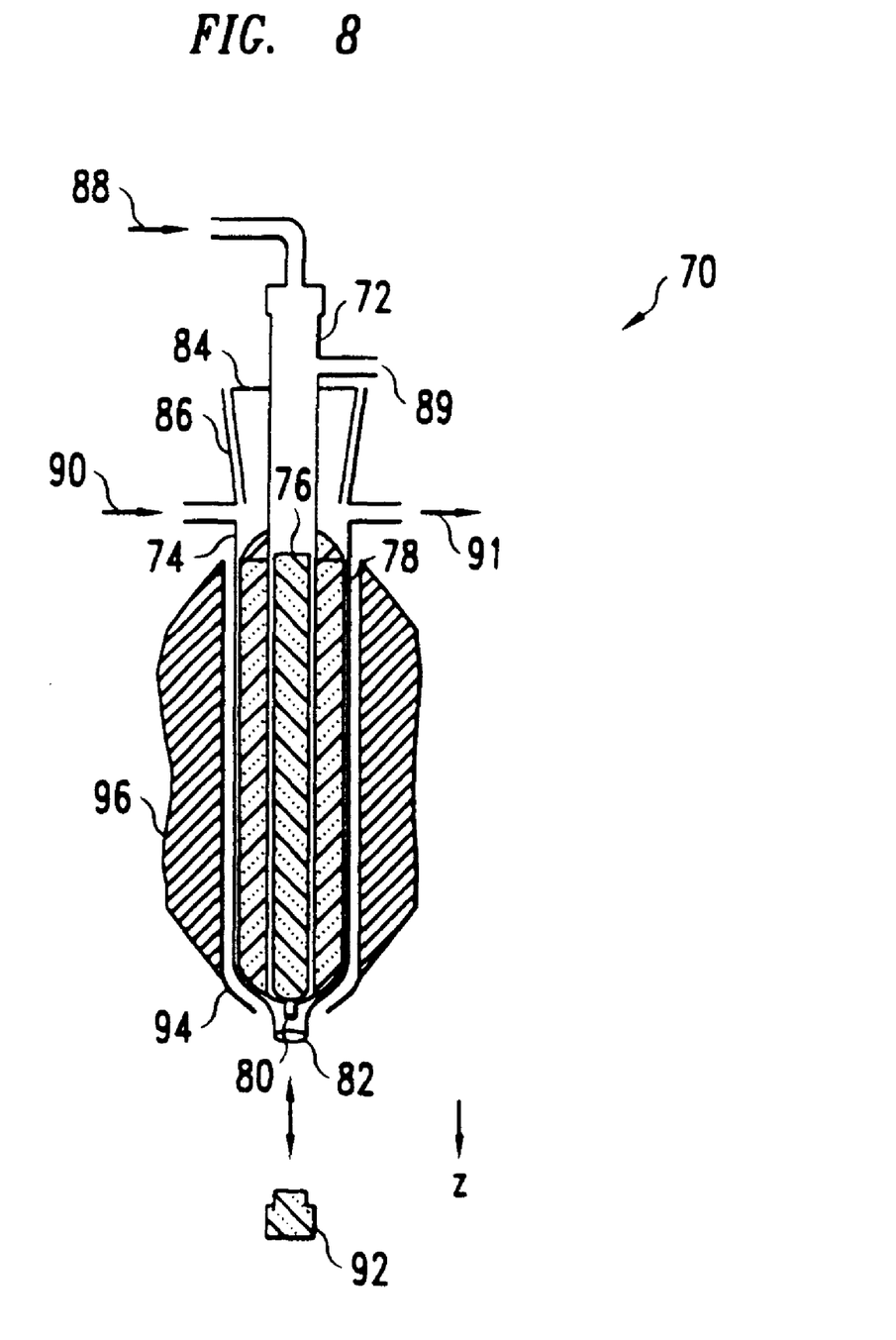
FIG. 8 shows a apparatus for drawing a chalcogenide glass fiber for use in some embodiments of the Raman amplifiers of FIGS. 1 and 2.

FIG. 8 is a cross-sectional view of an apparatus 70 for drawing chalcogenide glass amplifier fiber 26 shown in FIG. 3. The apparatus 70 includes inner and outer cylinders 72, 74 for holding separate chalcogenide glass preforms 76, 78 for making the fiber's core 24 and cladding 26, respectively. The inner and outer cylinders 72, 74 are concentric and have inner diameters of about 5–20 mm and 10–100 mm, respectively. The cylinders 72, 74 are made of quartz, platinum, or an alloy of platinum. The glass preform 76 has the composition of fiber core 27 and a rod-like shape that enables sliding the preform 76 into the inner cylinder 72. The glass preform 78 has the composition of fiber cladding 28 and a tubular shape that enables sliding the preform 78 into the separate tubular space between the inner and outer cylinders 72, 74.

Each cylinder 72, 74 tapers at a lower end to form a tubular draw port 80, 82. Herein, upper and lower make reference to directions with respect the direction "z" of gravity. The draw ports 80, 82 of the inner cylinder 72 have inner diameters of about 0.1–20 mm and 0.2–30 mm, respectively. The lower end of the inner port 80 is 0.5–5 mm upward from the lower end of the outer draw port 82.

Concentric and vertical relative alignments between inner and outer cylinders 72, 74 are achieved through matched conical seating sections 84, 86. The seating sections 84, 86 also seal the upper region between the inner and outer cylinders 72, 74 from the external ambient atmosphere, i.e., the seal prevents external gases from entering the region above the preform 78.

Adjustable ports 88–91 enable control of gas pressures in the regions above glass preforms 76, 78 during fiber drawing as well as introduction of gases into and removal of gases from these regions. Similarly, a removable plug 92 may be positioned to close ports 80, 82 and seal space below the glass preforms 76, 78 thereby stopping the escape of glass during melting.

Outer cylinder 74 is supported by a cylindrical metal body 94, i.e., made of an Iconel alloy or platinum. The metal body 94 is tapered at the lower end to physically retain the outer cylinder 74 from falling. The body 94 forms a thermal contact between outer cylinder 74 and an adjustable heater 96.

One construction for drawing apparatus 70 is described in U.S. Pat. No. 5,900,036, which is incorporated herein by reference in its entirety. Alternate apparatus and processes for drawing chalcogenide fibers are described in U.S. Pat. Nos. 5,879,426 and 6,021,649, which are also incorporated herein by reference in their entirety.

Figure 9:
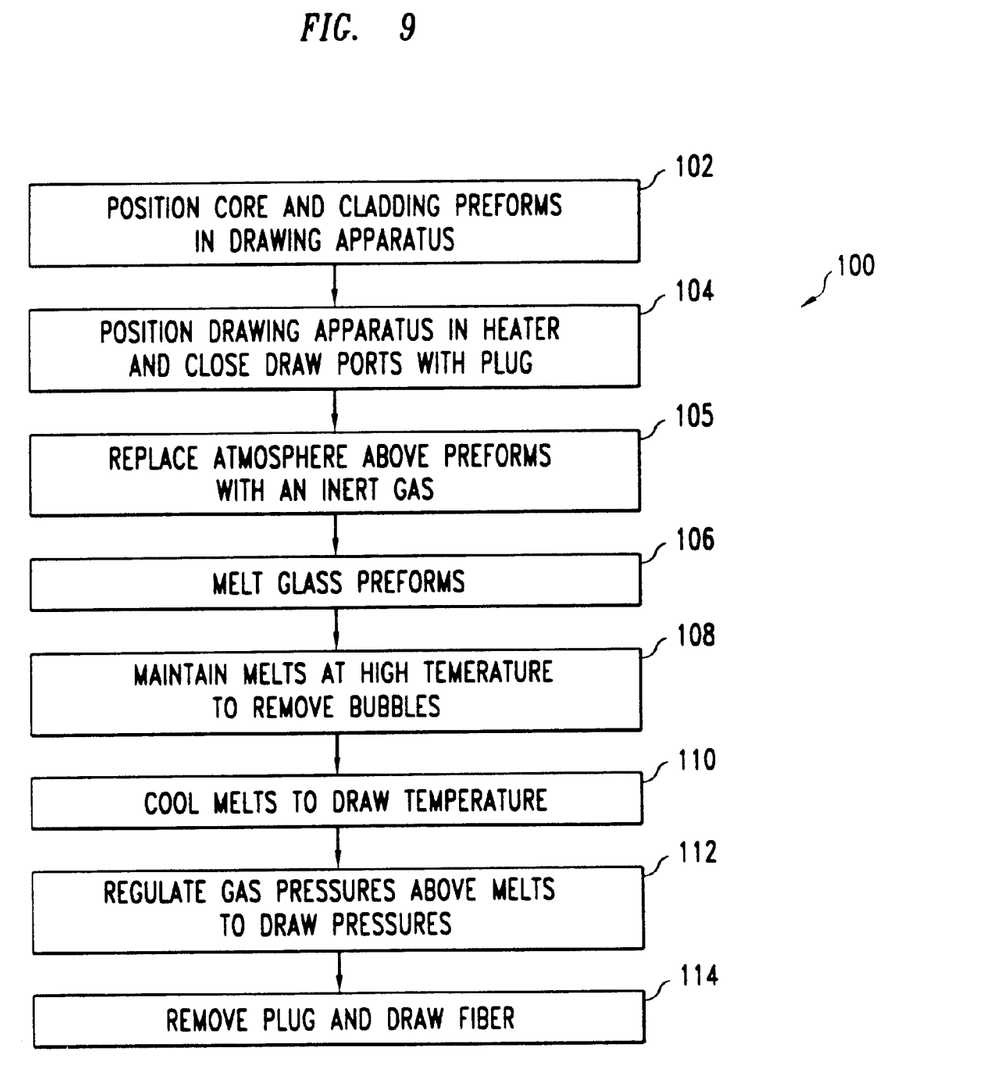
FIG. 9 is a flow chart showing one process for making chalcogenide glass fibers for use in some embodiments of the Raman amplifiers of FIGS. 1 and 2.

FIG. 9 is a flow chart for a process 100 of making chalcogenide glass fibers with drawing apparatus 70 of FIG. 8. The process 100 positions separate glass preforms 76, 78 for fiber core 27 and cladding 28 in cylinders 72, 74 and seats sections 84, 86 to seal the region above cylinders 72, 74 from external gases (step 102). Then, the process 100 positions the outer cylinder 74 in metal body 94 of heater 96 and closes ports 80, 82 with plug 92 (step 104). Then, ports 88–91 are used to replace atmospheres in regions above the glass preforms 76, 78 with an inert gas such as nitrogen or helium (step 105). The heater 96 is also regulated to slowly heat the forms 76, 78 to temperatures that cause the chalcogenide glasses of the preforms 76, 78 to melt (step 106). The process 100 maintains the melts from the preforms 76, 78 above melting temperatures for a sufficient period to remove bubbles from the melts, e.g., 0.25–6 hours (step 108). Then the process 100 cools the melts to a draw temperature over a period of 2–10 minutes (step 110). At the draw temperature, the chalcogenide materials have viscosities of $10^3$ to $10^7$ poises.

Next, ports 88–91 are operated to fix gas pressures over the core melt located inside inner cylinder 72 and the cladding melt located between inner and outer cylinders 72, 74 to selected draw pressures (112). The relative gas pressures over the two chalcogenide glass melts determine the relative diameters of core 27 and cladding 28 produced by the draw. Fibers with relatively thinner cores are produced by maintaining a relatively lower gas pressure over the core glass melt located in the inner cylinder 72 than over the cladding glass melt located between the cylinders 72, 74. After regulating the draw pressures, the plug 92 is removed and fiber is drawn from ports 80, 82 (step 114). Gas pressures are maintained at values of about 0.01 to 30 pounds per square inch above ambient external pressures to produce draw rates of about 1 to 10 meters of fiber per minute.

At a draw temperature of 345° C., draw pressures of 25.4 mm of water and 0.5 pounds-per-square-inch over respective melts of core and cladding glass produce a chalcogenide fiber with a $AS_{40}S_{58}Se_2$ core 27 having a diameter of 14 μm and a $As_2S_3$ cladding 28 having an outer diameter of 130 μm. To make a fiber of these dimensions, port 82 has an inner diameter of about 5 mm, and port 80 has an inner diameter of about 1 mm and a low end positioned about 0.5 mm upward from the lower end of the port 82. These draw conditions produce a draw rate of about three meters of fiber per minute.

Other embodiments of the invention will be apparent to those skilled in the art in light of the specification, drawings, and claims of this application.

What is claimed is:

1. An optical amplifier comprising:
  a chalcogenide glass optical waveguide having optical input and output ports;
  a pump optical waveguide; and
  a wavelength-tunable pump laser, the pump optical waveguide coupling the pump laser to the chalcogenide glass optical waveguide, and
  wherein the pump laser is adapted to cause Raman amplification in the chalcogenide glass optical waveguide of light received from the input port.

2. The optical amplifier of claim 1, wherein the chalcogenide glass optical waveguide is an optical fiber.

3. The optical amplifier of claim 2, wherein the optical fiber has a Kerr coefficient that is at least about 50 times as large as the Kerr coefficient of undoped silica glass.

4. The optical amplifier of claim 2, wherein the optical fiber has a length of less than about 500 meters and is capable of producing at least about 20 decibels of amplification to an optical signal received in the fiber in response to receiving less than about 500 milli-Watts of pump light power from the pump laser.

5. The optical amplifier of claim 1, wherein the pump laser is adapted to produce light with a wavelength in the range between about 1.3 and 1.6 microns.

6. The optical amplifier of claim 1, wherein the chalcogenide glass comprises a composition selected from a group consisting of a composition of As, Se, and S; a composition of Ge, Se, and Sb; and a composition of As, Se, and Te.

7. The optical amplifier of claim 1, wherein the pump laser has a wavelength tuning range at least spanning the range between about 1.3 and 1.6 microns.

8. An optical communication system, comprising:
  a plurality of silica glass optical fibers;
  at least one Raman amplifier coupled between two of the silica glass optical fibers, the Raman amplifier comprising:
    a chalcogenide glass optical waveguide connecting the two of the silica glass optical fibers;
    a pump optical waveguide; and
    a wavelength-tunable pump laser, the pump optical waveguide coupling the pump laser to the chalcogenide glass optical waveguide of the Raman amplifier, and
    wherein the pump laser is adapted to produce pump light adapted to cause Raman amplification of a selected wavelength of light in the chalcogenide glass optical waveguide.

9. The optical amplifier of claim 8, further comprising one of an optical transmitter and an optical receiver, the one of an optical transmitter and an optical receiver being connected to the Raman amplifier via one of the silica glass optical fibers.

10. The system of claim 9, wherein the pump laser is adapted to produce light with a wavelength in the range between about 1.3 and 1.6 microns.

11. A method of amplifying light, comprising:
  operating a pump laser to produce pump light adapted to produce Raman amplification in a chalcogenide glass optical waveguide in response to light of a selected wavelength;
  delivering the pump light to the chalcogenide glass optical waveguide;
  receiving input light with the selected wavelength in the chalcogenide glass optical waveguide; and
  sending amplified light from the chalcogenide glass optical waveguide to an output.

12. The method of claim 11, wherein the pump light has a wavelength in a range between about 1.3 and 1.6 microns.

13. The method of claim 11, wherein the pump light is delivered to the chalcogenide glass optical waveguide at a time of receipt of the input light therein.

14. The method of claim 11, wherein the intensity of the amplified light is at least about 20 dB times the intensity of the input light.

15. The method of claim 14, wherein the input light propagates through less than about 200 meters of the chalcogenide glass optical waveguide to produce the amplified light.

16. The method of claim 11, wherein the amplification of the input light per kilometer of the waveguide per 100 mW of pump light power is at least as large as about 40 decibels.

17. The method of claim 11, wherein the receiving and the delivering include transmitting the received and delivered lights into a chalcogenide glass optical fiber.

18. An optical amplifier comprising:
a chalcogenide glass optical waveguide that is undoped by rare-earth elements, the chalcogenide glass optical waveguide having optical input and output ports;
a pump optical waveguide; and
a pump laser, the pump optical waveguide coupling the pump laser to the chalcogenide glass optical waveguide; and
wherein the laser is adapted to producing Raman amplification of light in the chalcogenide glass optical waveguide.

19. The optical amplifier of claim 18, wherein the pump laser is adapted to produce light with a wavelength in the range between about 1.3 and 1.6 microns.

20. The optical amplifier of claim 18, wherein the chalcogenide glass comprises a composition selected from a group consisting of a composition of As, Se, and S; a composition of Ge, Se, and Sb; and a composition of As, Se, and Te.

* * * * *